(Model.)
3 Sheets—Sheet 1.
E. MEYER.
BEE HIVE.
No. 289,683.    Patented Dec. 4, 1883.
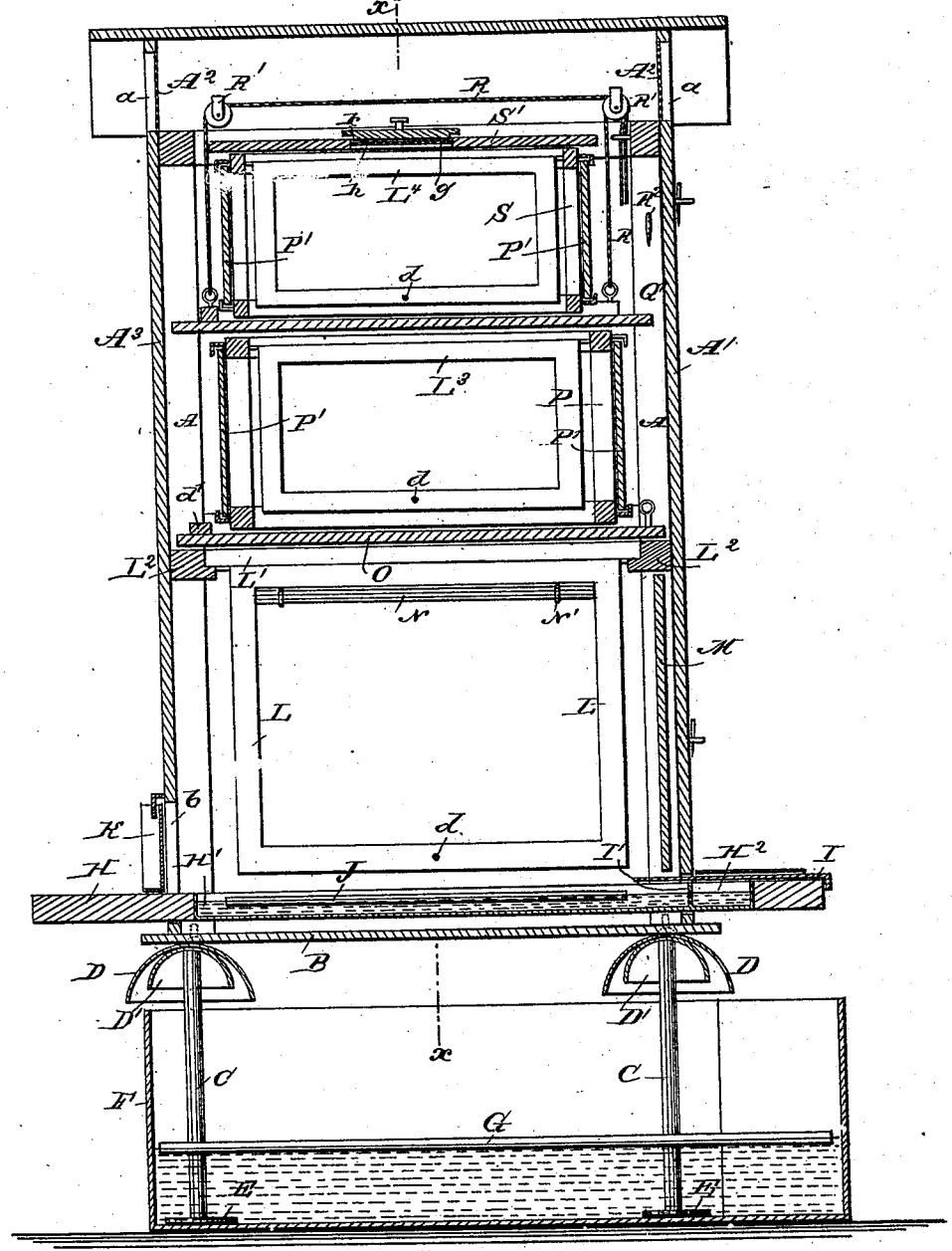
WITNESSES:
Otto Beyer
C. Sedgwick
INVENTOR:
E. Meyer
BY Munn & Co
ATTORNEYS.

(Model.)
3 Sheets—Sheet 2.
E. MEYER.
BEE HIVE.
No. 289,683. Patented Dec. 4, 1883.
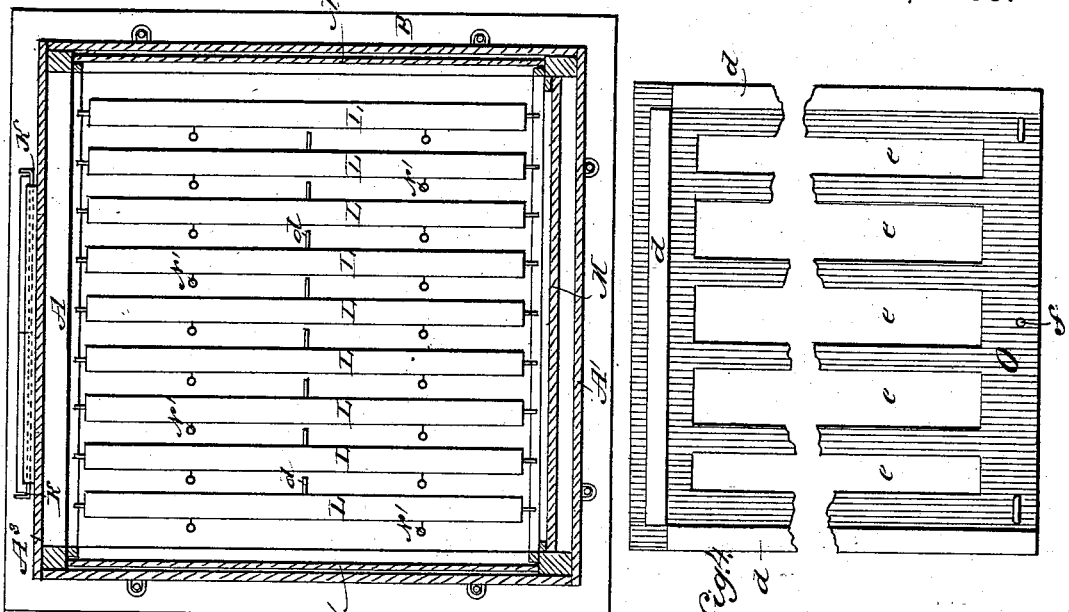
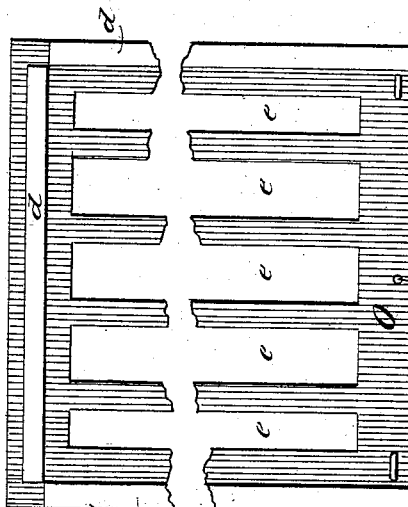
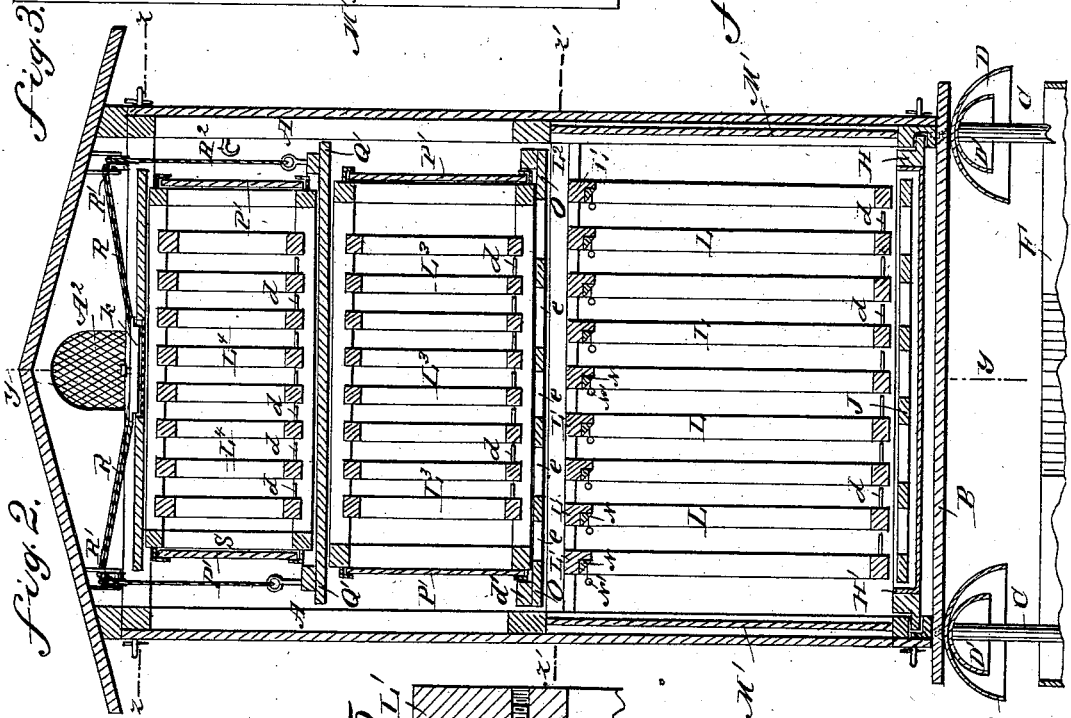
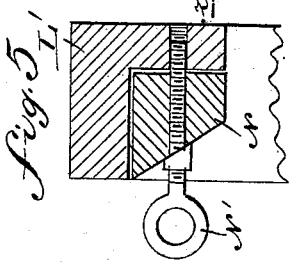
WITNESSES:
INVENTOR:
E. Meyer
BY Munn & Co.
ATTORNEYS.

(Model.)
E. MEYER.
BEE HIVE.
No. 289,683. 3 Sheets—Sheet 3.
Patented Dec. 4, 1883.
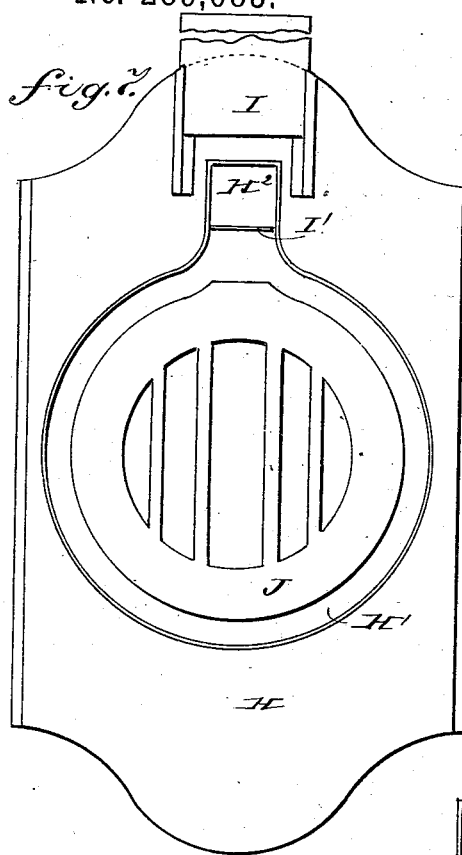
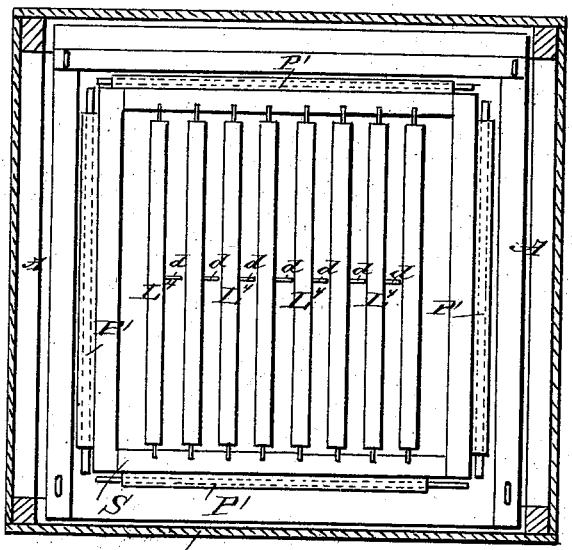
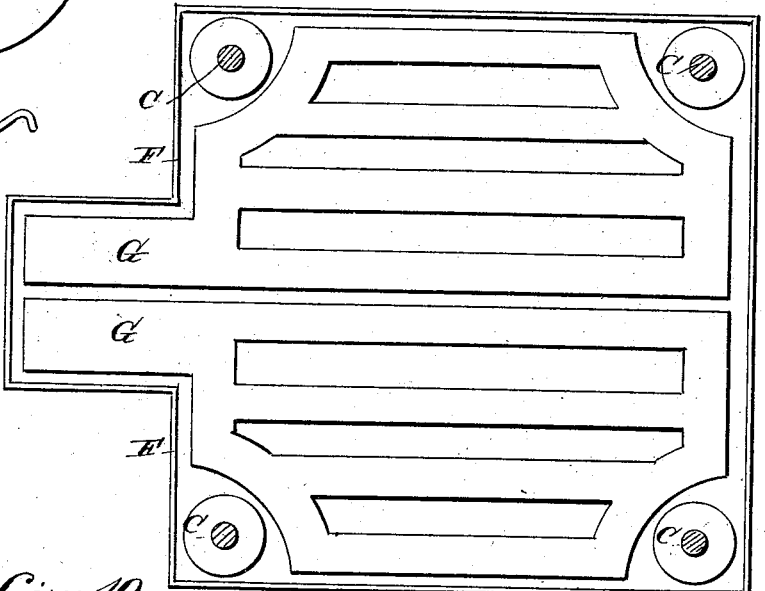
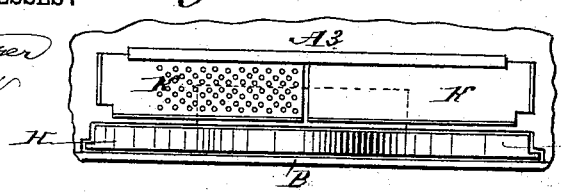
WITNESSES:
INVENTOR:
E. Meyer
BY
Munn & Co
ATTORNEYS.
N. PETERS, Photo-Lithographer, Washington, D. C.

UNITED STATES PATENT OFFICE.

EDWARD MEYER, OF HALLETTSVILLE, TEXAS.

BEE-HIVE.

SPECIFICATION forming part of Letters Patent No. 289,683, dated December 4, 1883.

Application filed December 13, 1882. (Model.)

*To all whom it may concern:*

Be it known that I, EDWARD MEYER, of Hallettsville, in the county of Lavaca and State of Texas, have invented a new and Improved Bee-Hive, of which the following is a full, clear, and exact description.

The object of my invention is to provide a new and improved bee-hive, in which the bees can be fed and watered very conveniently, from which honey can be removed without permitting the bees to escape from the hive, and also which is so constructed that the bees will produce an uncommonly large amount of honey and wax, and can be prevented from swarming and leaving the hive; and to these ends it consists in the peculiar construction and arrangement of parts, as hereinafter fully described, and pointed out in the claims.

Reference is to be had to the accompanying drawings, forming a part of this specification, in which similar letters of reference indicate corresponding parts in all the figures.

Figure 1 is a longitudinal sectional elevation of my improved bee-hive on the line $y\,y$, Fig. 2. Fig. 2 is a cross-sectional elevation of the same on the line $x\,x$, Fig. 1. Fig. 3 is a sectional plan view of the same on the line $z'\,z'$, Fig. 2. Fig. 4 is a plan view of the platform supporting the removable comb-chamber. Fig. 5 is a detail cross-sectional elevation of one of the frames for holding the combs. Fig. 6 is a sectional plan view of my improved hive on the line $z\,z$, Fig. 2. Fig. 7 is a plan view of the removable bottom of the bee-hive. Fig. 8 is a plan view of the water-tank, over which the bee-hive is held. Fig. 9 is a perspective view of the hook for removing the sliding board supporting the comb-holding chamber. Fig. 10 is a detail plan view of the sliding gates which close the entrance and exit openings at the front of the bee-hive.

The bee-hive is formed of a box having an internal frame-work, A, having a ground plan in the shape of a square, which is the most advantageous shape, as it causes a regular and uniform heat in the hive during the winter. The box rests on a removable floor, B, which is secured to the under side of the box by means of suitable screws, &c. The front and rear sides, A' A³, of the box are removable, and are fastened to the frame-work A and to the floor and roof by means of any well-known suitable device. Both the front and rear walls of the box are provided at the top and under the peaks of the roof with ventilation-openings $a$, which are closed by perforated metal plates or wire nettings A². The floor B rests upon a series of rods or standards, C, which are each provided at the upper end with an inverted-cup-shaped vessel, D, and a smaller inverted-cup-shaped vessel, D', therein, and which are provided at the lower ends with base-plates E, which rest upon the bottom of a water-tank, F, which tank contains two floating slotted platforms or floats, G, which have their corners rounded out, so as not to interfere with the standards C, which support the hive.

Bees require a very great quantity of water, and lose much time in going from the hive to places where they can find the requisite quantity of water, and for that purpose I have provided the tank F, directly below the hive. That the bees may not be drowned while sipping water, I have provided the slotted floats G, upon which they can alight and sip safely.

In order to prevent ants and other insects and vermin not kept back by the water in the tank F from passing into the hive, I have provided the cups D and D' at the upper ends of the standards C. If a bug manages to crawl down the inner surface of the cup D' and up the outer surface of the same, it cannot manage to get on the cup D without lying on its back, and then it will drop down into the water, and must repeat its attempts, but will never be successful.

The float G should always be made in two parts, so as to facilitate its removal from the tank. The tank F need be only a few inches high. Both the front and the rear sides, A' A³, of the box are provided at the bottom with a transverse horizontal slot, through which a sliding platform or floor, H, can be passed into the hive in such a manner that a part of the floor projects from both the front and rear sides of the same. The middle of the floor H contains a tank, H', which is to receive the food for the bees, and at the rear end of the floor H the said tank terminates in a contracted part, H², which can be closed by a horizontally-sliding door, I. A transverse perforated partition, I′, is arranged at the inner end of the contracted part H², to prevent the bees from passing from the tank H′ into the contracted part H². A slotted or perforated float, J, is contained within the tank H′, to prevent the bees from being drowned while sipping their food, which is placed in the tank H′. The front A³ of the hive is provided with an opening, b, at the bottom, which can be closed by two slides, K, held on the outer surface of the front of the hive, one of which slides is to be provided with air-holes. If the food is to be placed in the tank H′, the slide I is removed and the food is poured into the contracted part H², and flows through the transverse perforated partition I′ into the tank H′. In case the tank H′ is to be cleaned, the entire floor H is removed, when it can easily be cleaned and the bodies of dead bees can be removed.

It is of great importance to facilitate the feeding of bees, as it has been found that the only rational way to keep bees is to feed them and cause the queen to lay numerous eggs.

The comb-frames L are suspended by means of their top pieces, L′, from two transverse pieces, L², attached to and forming part of the internal frame-work, A, of the hive, in such a manner that the comb-frames will be parallel with the sides of the hive and at right angles to the front and rear of the same, and their lower edges will be but a short distance above the removable bottom or floor H. I thus obtain a great number of passages through which the bees can pass to the upper stories. This is of great importance, as when the bees come home loaded with honey and with wax they must be able to ascend to the upper stories, where they deposit the honey and wax as rapidly as possible.

The several comb-frames are separated an equal distance by means of pins d, in the usual manner. At the rear end of the hive a pane of glass, M, is inserted between the removable bottom and the cross-piece L², so that when the rear side, A′, of the hive is removed the bees cannot escape.

By arranging the comb-frames in the manner described a very good ventilation is obtained in the hive, and the frames can be reached from both the front and back of the hive, which is of especial importance in raising queens, or in case artificial combs are used. The said frames L′ are rabbeted, as shown in Fig. 5, and the edges of the artificial combs are held in the said frames L by means of a smaller frame, N, which fits into the rabbeted parts of the frames L, and are held to the said frames L by means of suitable screws, N′. The sides of the chamber containing the comb-frames L are formed of glass panes M′, so that when the sides of the hive are removed the bees cannot escape out of the compartment containing the said comb-frames. A horizontal partition or intermediate floor, O, which is provided with a series of longitudinal slots, e, rests upon the cross-pieces L² L² and supports a comb-holding box, P, the sides of which are formed of sliding panes P′, of glass, moving in ways or guides formed at the top and bottom of the box P. The comb-frames L³ of the box P are of the same construction as those described above, but smaller. Cleats or strips d′, secured on the platform or intermediate horizontal partition, O, at the side and front edges, hold the comb-box P in place. At the rear end the horizontal partition O is provided with an aperture, f, for receiving the end of a hook, Q, by means of which the horizontal partition O and the comb-box P thereon can be withdrawn from the hive by removing the rear side of the hive. Above the comb-box P a slotted platform, Q′, is suspended by means of cords R, which cords run over pulleys R′, attached to the under side of the roof of the hive, and the free ends of the cords can be secured on a hook, R², on the inner surface of the frame-work A of the hive. By means of the said cords the platform Q′ can be raised or lowered, as may be desired. A box, S, similar to the box P, but smaller, and adapted to receive comb-frames L⁴, rests upon the slotted platform Q′, and I have named the said box S "winter-magazine." The box S is provided with sliding glass sides and ends P′, the same as the box P. The said box S is provided with a top plate, S′, provided with an opening, g, which is provided with a perforated plate, h, and can be closed by a removable cover, k. The said cover is to be removed in case the box is to be ventilated. The top plate, S′, is secured on the box S by means of screws or pins, or is held in place in any other suitable manner.

If a pane, P′, is to be removed from the box P or S, for the purpose of cleaning the said pane or replacing it by another, a strip or a pane of like size is inserted in such a manner as to gradually push out the pane P′ from between its guides. During the winter the platform or horizontal partition O and the box P thereon are removed from the hive, and the platform Q′ rests directly over the lowest compartment, containing the comb-frames L. If a large swarm of bees inhabit the hive, both slides K must be opened; but if the swarms are not very large, and at the times that the bees do not collect very large quantities of honey, one of the slides K can remain closed. In the spring the bees will first fill the winter-magazine S, which, as stated before, is at this time directly above the comb-frames L.

The eggs are laid in the combs in the frames L, and are surrounded by honey and wax. As soon as this has taken place, which can be seen through the panes M and M′, it becomes necessary to form a space between the comb-frames containing the eggs and the winter-magazine, for the bees will fill this space as rapidly as they possibly can, and thus produce a very large quantity of honey and wax. For this purpose horizontal partitions are inserted between the upper part of the frames L and the horizontal partition Q′, and the winter-box S and said partition, so that none of the bees can leave the parts of the hive below or above the horizontal partitions that have been inserted. By means of the cords R the horizontal partition Q', holding the winter-magazine S, is raised, and the horizontal partition O, carrying the comb-frame-holding box P, is inserted, so that the box P will be below the winter-magazine and above the frames L. The partitions that have been inserted to divide the hive into different compartments while making the above changes are then withdrawn, and communication is established between all parts of the hive. Then the bees go to work and fill the combs in the frames L³ as rapidly as they possibly can. If the filled combs are to be removed, horizontal partitions are inserted, so that the bees cannot escape, and the box containing the filled combs is removed and another box is inserted in its place. The bees then proceed to fill the combs in the second box in the same manner as before. The box that has been removed is taken to a place about twenty yards from the hive, and the bees contained therein will fill themselves with as much honey as possible and return to the hive, and in this way the box may be freed from bees.

My above-described bee-hive has a great many advantages over all other bee-hives. The feeding and watering of the bees is greatly facilitated; there is no danger of being injured by the bees while removing the combs; the bees are caused to produce an uncommonly large amount of honey and wax; and, finally, none of the enemies of the bees can enter the hive.

In case a swarm of bees is to be admitted to the hive, the bottom B of the hive is removed, and the box containing the swarm is placed below the hive, so that the bees can pass directly into the hive from the box.

Having thus fully described my invention, I claim as new and desire to secure by Letters Patent—

1. In a bee-hive, the combination, with the bottom comb-frames, L, and the box P, containing the frames L³, of the partition Q', the box S, provided with the frames L⁴, and means for raising and lowering said partition, substantially as herein shown and described.

2. The combination, with the bee-hive case A, of the sliding horizontal partition O, the comb-frame-holding box P thereon, the horizontal partition Q', the comb-frame-holding box S, the cords R, attached to the partition Q', and the pulleys R', substantially as herein shown and described, and for the purpose set forth.

3. The combination, with the bee-hive case A, of the sliding and removable floor H, containing a feed trough or tank, H', terminating in the contracted part H², the transverse perforated partition I', and the slide I, for covering the top of the contracted part, substantially as herein shown and described, and for the purpose set forth.

4. In a bee-hive, the combination, with the sliding and removable floor H, provided with the feed-tank H', terminating in the contracted part H², of the transverse perforated partition I', the slide I, and the float J, substantially as herein shown and described.

5. In a bee-hive, the combination, with the floor B and the tank F, of the rods C, provided with the inverted cups D D' at their upper ends and the base-plates E at their lower ends, and adapted to support the hive above the said tank, substantially as herein shown and described.

6. The combination, with the tank F and the standards C, supporting the hive above the tank, of the float G, made in two parts, and having its corners rounded, substantially as herein shown and described.

7. The combination, with a rabbeted comb-holding frame, of the frames N and screws N', for holding the frames N within the rabbeted part of the comb-holding frame, substantially as herein shown and described, and for the purpose set forth.

EDWARD MEYER.

Witnesses:
GEO. KROSCHEL,
ANTON APPELT.